United States Patent
Schlitter

(10) Patent No.: US 9,636,899 B2
(45) Date of Patent: *May 2, 2017

(54) METHOD FOR CUTTING TO LENGTH A PIECE OF TUBE FROM A TUBE

(71) Applicant: Neoperl GmbH, Mullheim (DE)

(72) Inventor: Roger Schlitter, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,615

(22) Filed: Jul. 10, 2015

(65) Prior Publication Data
US 2015/0306860 A1    Oct. 29, 2015

Related U.S. Application Data

(63) Continuation of application No. 13/597,731, filed on Aug. 29, 2012, now Pat. No. 9,089,984.

(51) Int. Cl.
*B32B 38/00* (2006.01)
*B32B 37/12* (2006.01)
(Continued)

(52) U.S. Cl.
CPC ............ *B32B 38/0004* (2013.01); *B26D 3/16* (2013.01); *B26D 7/08* (2013.01); *B26F 3/08* (2013.01);
(Continued)

(58) Field of Classification Search
CPC ..... B32B 38/0004; B32B 37/18; B32B 37/12; B32B 2597/00; B26F 3/08; B26F 3/06;
(Continued)

(56) References Cited

U.S. PATENT DOCUMENTS 1,505,113 A    8/1924    Warnock
2,449,356 A    9/1949    Wilkoff
(Continued)

FOREIGN PATENT DOCUMENTS

EP    1489343 A1    12/2004
EP    1880812 A1    1/2008
(Continued)

OTHER PUBLICATIONS

International Search Report (ISR) with regard to PCT/EP2013/066729 as completed by the EPO on Jan. 16, 2014 and mailed on Jan. 22, 2014.

*Primary Examiner* — John C Hong
(74) *Attorney, Agent, or Firm* — Volpe and Koenig, P.C.

(57) ABSTRACT

A method for cutting to length a piece of tube having an inner tube and an outer tube sheathing, the piece of tube being detached with the aid of a cutting tool at a cutting site in a plane oriented transversely to the longitudinal extent of the tube. The tube sheathing is surrounded by a severable tube fixing element, which covers over the intended cutting site before the piece of tube is detached using the cutting tool at the cutting site, and the tube fixing element completely encloses the outer tube sheathing in the circumferential direction. The tube fixing element is fixed on the tube sheathing and/or the tube enclosed by the tube fixing element is severed with the cutting tool such that a relative displacement of the tube fixing element with respect to the tube sheathing or of the tube sheathing with respect to the inner tube is prevented.

4 Claims, 6 Drawing Sheets

(51) Int. Cl.
  *B26B 3/08* (2006.01)
  *B32B 37/18* (2006.01)
  *B26D 3/16* (2006.01)
  *B26D 7/08* (2006.01)
  *F16L 11/04* (2006.01)
  *B26F 3/08* (2006.01)
  *B26F 3/06* (2006.01)

(52) U.S. Cl.
  CPC .............. *B32B 37/12* (2013.01); *B32B 37/18* (2013.01); *F16L 11/04* (2013.01); *B26F 3/06* (2013.01); *B32B 2597/00* (2013.01); *Y10T 29/49817* (2015.01); *Y10T 83/0405* (2015.04); *Y10T 83/0596* (2015.04)

(58) Field of Classification Search
  CPC ... F16L 11/04; B26D 3/16; B26D 7/08; Y10T 83/0405; Y10T 83/0596; Y10T 29/49817
  See application file for complete search history.

(56) References Cited

U.S. PATENT DOCUMENTS

| | | |
|---|---|---|
| 2,654,869 A | 10/1953 | Mudd |
| 3,113,408 A | 12/1963 | Kirkpatrick et al. |
| 3,474,655 A | 10/1969 | Fulkerson |
| 5,593,756 A | 1/1997 | Miller |
| 6,005,191 A | 12/1999 | Tzeng et al. |
| 6,181,857 B1 * | 1/2001 | Emeterio ............. G02B 6/4495 385/100 |
| 2002/0098311 A1 | 7/2002 | Lindner |
| 2007/0088319 A1 | 4/2007 | Martone |
| 2008/0016936 A1 | 1/2008 | Schlitter |

FOREIGN PATENT DOCUMENTS

| | | |
|---|---|---|
| FR | 2762376 A3 | 10/1998 |
| GB | 1505113 A | 3/1978 |
| JP | 57184065 A | 11/1982 |
| JP | 07311313 A | 11/1995 |
| WO | WO2010059542 A1 | 5/2010 |

\* cited by examiner

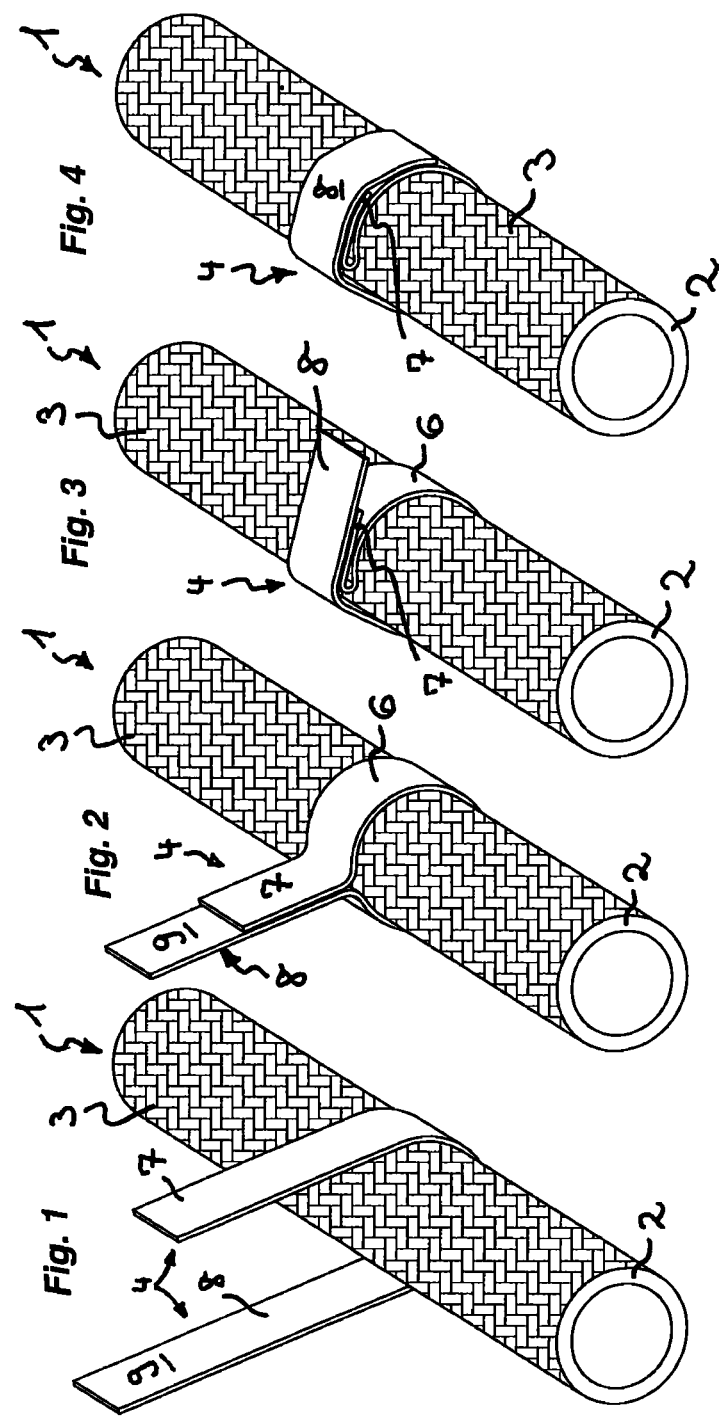

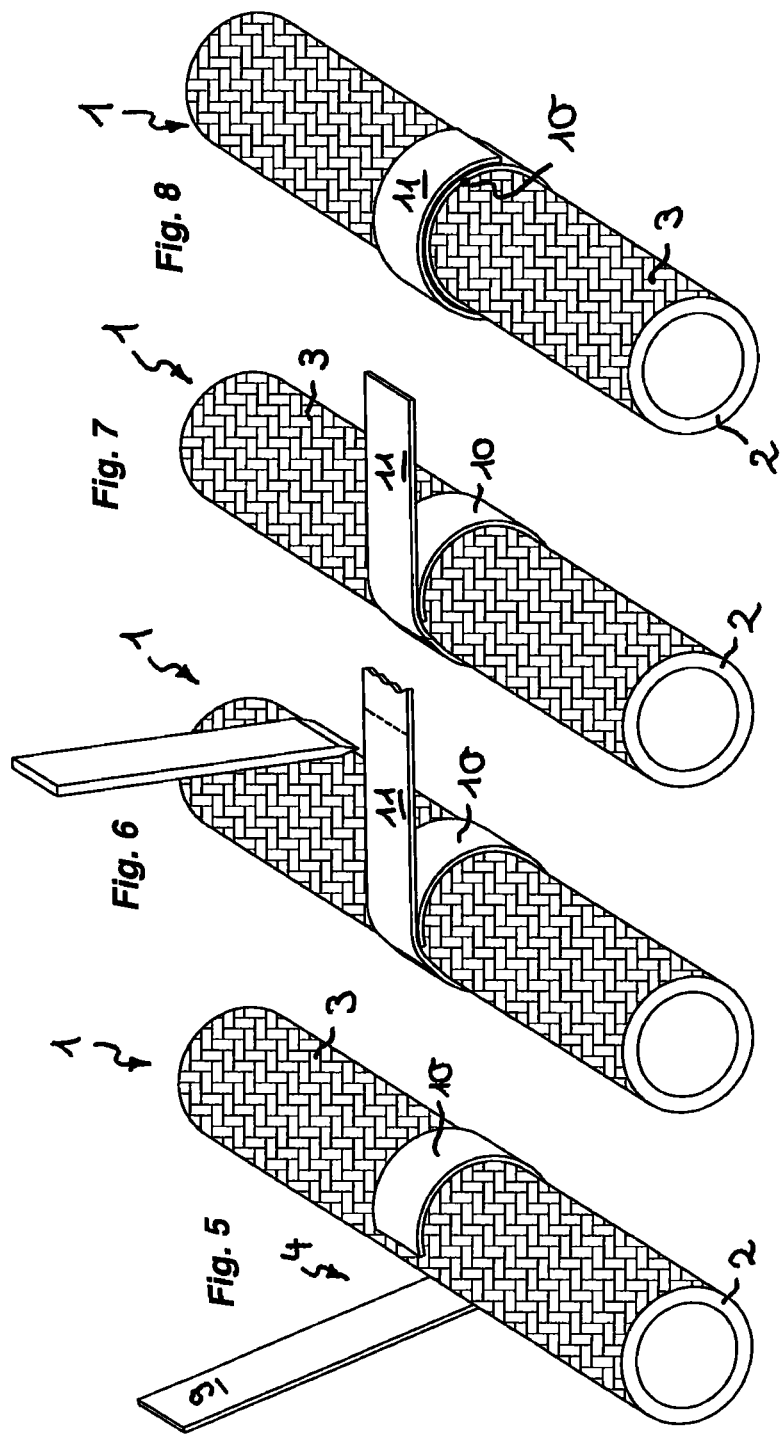

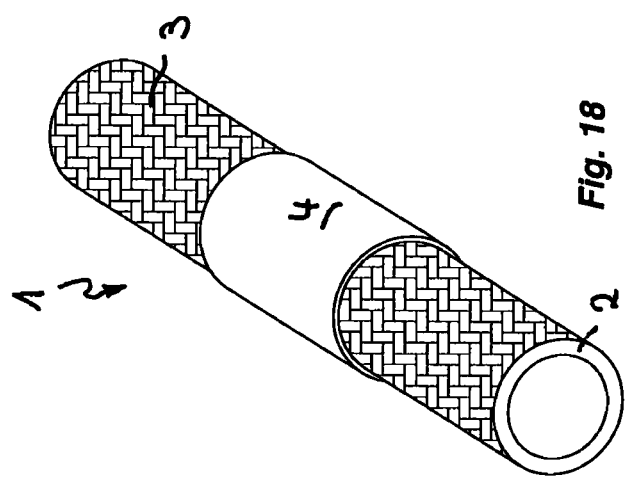

METHOD FOR CUTTING TO LENGTH A PIECE OF TUBE FROM A TUBE

INCORPORATION BY REFERENCE

The present application is a continuation of U.S. patent application Ser. No. 13/597,731, filed Aug. 29, 2012, the entire contents of which are incorporated by reference herein as if fully set forth.

BACKGROUND

The invention relates to a method for cutting to length a piece of tube from a tube, which tube has an inner tube and an outer tube sheathing, enclosing the inner tube, the piece of tube being detached from the tube with the aid of a cutting tool at a cutting site in a cutting plane oriented transversely to the longitudinal extent of said tube, the tube sheathing of the tube being surrounded by a severable tube fixing element, which covers over the intended cutting site before the piece of tube is detached from the tube with the aid of the cutting tool at the cutting site, and the tube fixing element completely enclosing the outer tube sheathing in the circumferential direction.

US 2008/0016936 A1 already discloses a method of the type mentioned at the beginning which is used for cutting to length a piece of tube from a tube that has an inner tube and an outer tube sheathing, which encloses the inner tube and is formed as a braiding of metal or plastic filaments. To be able to detach the piece of tube from the tube with the aid of a cutting tool at a cutting site in a cutting plane oriented transversely to the longitudinal extent of the tube, the previously known method envisages surrounding the tube sheathing of the tube by a severable tube fixing element, which covers over the intended cutting site before the piece of tube is detached from the tube with the aid of the cutting tool at the cutting site. Although the previously known method prevents individual metal or plastic filaments of the braiding that is provided as the tube sheathing from being able to snag when it is intended to push a clamping sleeve onto the piece of tube cut to length in this way, these clamping sleeves usually have a clamping sleeve inner diameter that is adapted in comparison with the outer diameter of the piece of tube in such a way that, when the clamping sleeve is pushed on, there is the risk of the tube fixing element being pushed back with respect to the tube sheathing and, in addition or instead of that, the tube sheathing being pushed back with respect to the inner tube, whereby in turn the clamping sleeve is not held sufficiently securely and firmly on the corresponding end of the piece of tube. If, on the other hand, the clamping sleeve is produced with a significantly greater inner diameter in comparison with the outer diameter of the tube braiding, in order to achieve a large radial distance between these two parts in the undeformed state and avoid a collision of the ends of the braiding with the clamping sleeve during the pushing-on operation, this large radial distance has disadvantageous effects in the subsequent crimping operation.

SUMMARY

There is therefore particularly the objective of improving the method mentioned at the beginning in such a way as to minimize the risk of the tube fixing element being displaced with respect to the tube sheathing or the tube sheathing being displaced with respect to the inner tube when a piece of tube is pushed on.

To meet this objective, it is provided by the invention, in the case of the method mentioned at the beginning, that the tube fixing element is fixed on the tube sheathing and/or the tube enclosed by the tube fixing element is severed with the aid of the cutting tool in such a way that a relative displacement of the tube fixing element with respect to the tube sheathing or of the tube sheathing with respect to the inner tube is prevented.

Also in the case of the method according to the invention, before cutting to length a piece of tube, the tube sheathing is surrounded by a severable tube fixing element which covers over the intended cutting site before the piece of tube is severed from the tube with the aid of the cutting tool at the cutting site. The method according to the invention provides here that the tube fixing element completely encloses the outer tube sheathing in the circumferential direction, and consequently the tube sheathing covers over or wraps around at least 360° of the circumference. In this case, the tube fixing element is fixed on the tube sheathing and/or the tube enclosed by the tube fixing element is severed with the aid of a cutting tool in such a way that a relative displacement of the tube fixing element with respect to the tube sheathing or of the tube sheathing with respect to the inner tube is prevented.

A particularly simple procedure which makes it considerably easier to apply such a tube fixing element to a tube provides that the tube fixing element is a single-sided adhesive tape.

At the same time, a variant of the method according to the invention provides that the tube fixing element formed as adhesive tape has a middle piece which completely encloses the tube and is adjoined on both sides by tube-fixing-element end pieces, that the tube-fixing-element end pieces lie with their adhesive surfaces against one another, and that the tube-fixing-element end pieces that are lying with their adhesive surfaces against one another are placed against the tube in such a way that the adhesive surface of one of the tube-fixing-element end pieces is adhesively held on the tube or on the piece of tube by a partial region extending over the other tube-fixing-element end piece.

A further embodiment according to the invention provides that the tube fixing element formed as adhesive tape has two tube-fixing-element partial regions, which are connected to one another and of which one tube-fixing-element partial region completely encloses the tube and of which the other tube-fixing-element partial region is adhesively held with its adhesive surface on the outer side of the tube-fixing-element partial region enclosing the tube. This embodiment according to the invention offers the advantage that the tube fixing element protrudes only a little beyond the outer diameter of the tube sheathing.

A development of the method according to the invention is provided in that the tube fixing element is a shrink tube, the clear tube diameter of which can be reduced by exposure to heat in such a way that the shrink tube lies immovably against the tube outer circumference and in particular against the tube sheathing of the tube. Such a shrink tube may also be formed as a band of plastic running endlessly around and completely enclosing the tube sheathing. When the shrink tube is exposed to heat, its clear tube diameter is reduced in such a way that the shrink tube comes to lie taut against the tube sheathing. At the same time, however, the tube sheathing is thereby also pressed onto the inner tube in such a way that a displacement of the tube fixing element with respect to the tube sheathing and of the tube sheathing with respect to the inner tube is prevented.

In the case of longer pieces of tube, onto which a shrink tube can possibly only be pushed and positioned with difficulty, a simple and advantageous variant of the method according to the invention provides that the tube fixing element is formed in an injection-molding process as a surround that completely encloses the tube sheathing in the circumferential direction in a partial portion.

To avoid undesired transverse forces when cutting to length the piece of tube that could bring about a displacement of the tube fixing element with respect to the tube sheathing or even of the tube sheathing with respect to the inner tube at least in the axial direction, an embodiment according to the invention that represents a development provides that the tube is cut to length by a cutting blade that serves as a cutting tool and is guided approximately perpendicularly to the longitudinal direction of the tube. With the aid of such a cutting blade guided approximately perpendicularly to the longitudinal direction of the tube, the piece of tube can be cut to length from the tube at the desired cutting site.

It is also possible, however, for the tube to be cut to length by a cutting tool that develops a cutting heat, to be precise preferably in such a way that the plastics material that becomes pasty while exposed to the cutting heat adhesively bonds, fuses or similarly fixes at least one of the component parts: the tube fixing element, tube sheathing or inner tube, at least in certain regions to at least one of the adjacent component parts, in order to secure the relative position between the tube sheathing and the inner tube. If a tube sheathing produced for example from plastic filaments is cut to length with such a cutting tool developing cutting heat, the plastics material of the plastic filaments that becomes pasty due to the cutting heat can adhesively bond or fuse to the tube sheathing and/or the inner tube in such a way that a relative displacement of these component parts at least in the axial direction is avoided.

A preferred embodiment according to the invention provides that a clamping sleeve, a crimping sleeve or a sleeve-shaped tube end piece is pushed onto the end of the piece of tube that is secured with the aid of the tube fixing element and that the tube fixing element projects over the inner end of the clamping sleeve, crimping sleeve or the tube end piece and forms an anti-kink device.

BRIEF DESCRIPTION OF THE DRAWINGS

Developments according to the invention are provided by the figures in conjunction with the claims and the description. The invention is described in more detail below on the basis of preferred exemplary embodiments.

In the figures:

FIGS. 1 to 4 show individual method steps of a method intended for cutting to length a piece of tube, a tube fixing element formed as an adhesive tape being applied to the tube that is to be cut to length and having a middle piece which completely encloses the tube and is adjoined on both sides by tube-fixing-element end pieces, FIGS. 5 to 8 show method steps of a method likewise intended for cutting to length a piece of tube, a tube fixing element formed as an adhesive tape being applied to the tube that is to be cut to length and having two tube-fixing-element partial regions, of which one tube-fixing-element partial region completely encloses the tube and of which the other tube-fixing-element partial region is adhesively held with its adhesive surface on the outer side of the tube-fixing-element partial region enclosing the tube, FIG. 18 shows a tube prepared for cutting to length a piece of tube, an overmolding of the tube that completely surrounds the tube in the circumferential direction in a partial portion being formed in the region of the intended cutting site.

DETAILED DESCRIPTION OF THE PREFERRED EMBODIMENTS

Various variants of a method according to the invention that is intended for cutting to length a piece of tube 1 from a flexible tube are presented in FIGS. 1 to 18. The tube used for the piece of tube 1 has an inner tube 2 and an outer tube sheathing 3, enclosing the inner tube 2. The tube sheathing 3 is formed here as a braiding, which is produced by interwoven metal or plastic filaments. It is also possible to use a hybrid braiding, the braiding filaments of which consist partly of plastic and partly of metal.

The piece of tube 1, which is required for example for producing a flexible sanitary tube line, is detached from the tube with the aid of a cutting tool at a cutting site in a cutting plane oriented transversely to the longitudinal extent of said tube. For this purpose, the tube sheathing 3 is surrounded by a severable tube fixing element 4, which covers over the intended cutting site before the piece of tube 1 is detached from the tube with the aid of the cutting tool at the cutting site.

Figure 13:
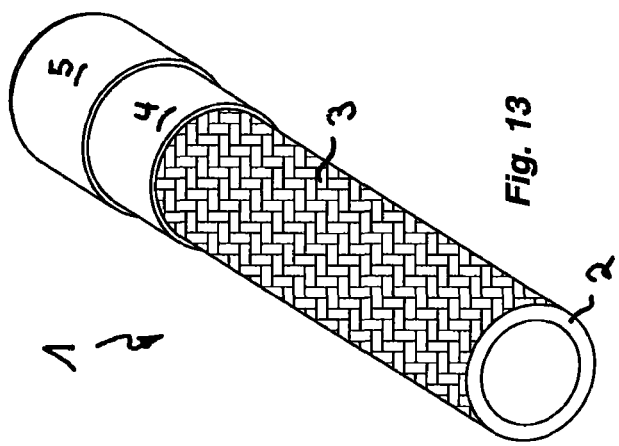
FIGS. 12 and 13 show tube fixing element projecting over a tube end piece and serving as an anti-kink device, in a side view (FIG. 12) and a perspective representation (FIG. 13)
Figure 12:
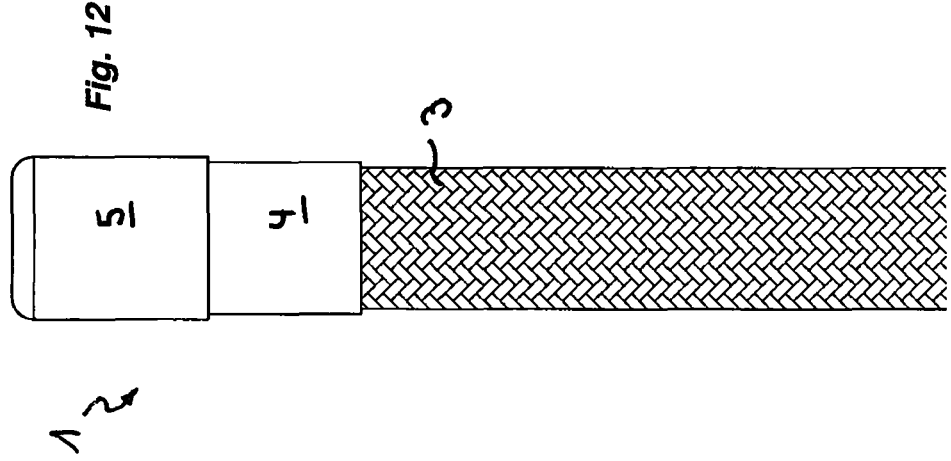

Sanitary tube lines usually have on both end faces a sleeve-shaped tube end piece 5, formed for example as a clamping or crimping sleeve (cf. FIGS. 12 and 13). Since the clear sleeve inner diameter of such a tube end piece 5 corresponds more or less approximately to the outer diameter of the tube sheathing 3, particularly provided with a tube fixing element 4, there is the problem of minimizing the risk of the tube fixing element 4 being displaced with respect to the tube sheathing 3 or the tube sheathing 3 being displaced with respect to the inner tube 2 when a tube end piece 5 is pushed on.

To solve this problem, it is provided in the case of the method variants represented here that the tube fixing element 5 completely encloses and is fixed on the outer tube sheathing 3 in the circumferential direction and/or the tube enclosed by the tube fixing element 4 is severed with the aid of the cutting tool in such a way that a relative displacement of the tube fixing element 4 with respect to the tube sheathing 3 or of the tube sheathing 3 with respect to the inner tube 2 is prevented.

In FIGS. 1 to 4 on the one hand and FIGS. 5 to 8 on the other hand, two variants of such a method in which the tube fixing element 4 is formed by a single-sided adhesive tape are illustrated. An adhesive tape serving as a tube fixing element 4 can be positioned and applied at almost any location of a tube, which may even be long. In addition, a single-sided adhesive tape has the advantage that the adhesive tape can be drawn firmly onto the tube in such a way that the adhesive tape serving as the tube fixing element 4 is fixed on the tube sheathing 3 and the tube sheathing 3 is fixed on the inner tube 2 and an unintentional relative displacement of these component parts 2, 3 and 4 is prevented.

In the case of the procedures that are shown in FIGS. 1 to 4, the tube fixing element 4 formed as adhesive tape has a middle piece 6, which completely encloses the tube and is adjoined on both sides by tube-fixing-element end pieces 7, 8. These tube-fixing-element end pieces 7, 8 lie with their adhesive surfaces 9 against one another, the tube-fixing-element end pieces 7, 8 that are lying with their adhesive surfaces 9 against one another being placed against the tube in such a way that the adhesive surface 9 of one of the tube-fixing-element end pieces 7, 8 is adhesively held on the tube or on the piece of tube 1 by a partial region extending over the other tube-fixing-element end piece 8, 7.

Since it is thereby ensured that the tube-fixing-element end pieces 7, 8 do not disruptively protrude beyond the tube, the tube end piece 5 can easily be pushed over the extreme end of a tube.

By contrast, the procedure shown in FIGS. 5 to 8 has two tube-fixing-element partial regions 10, 11, which are connected to one another and of which one tube-fixing-element partial region 10 completely encloses the tube and of which the other tube-fixing-element partial region 11 is adhesively held with its adhesive surface 9 on the outer side of the tube-fixing-element partial region 10 enclosing the tube. In the case of this procedure, the tube fixing element 4 scarcely protrudes beyond the outer diameter of the tube sheathing 3, so that here a sleeve-shaped tube end piece 5 can be easily pushed on.

Figure 11:
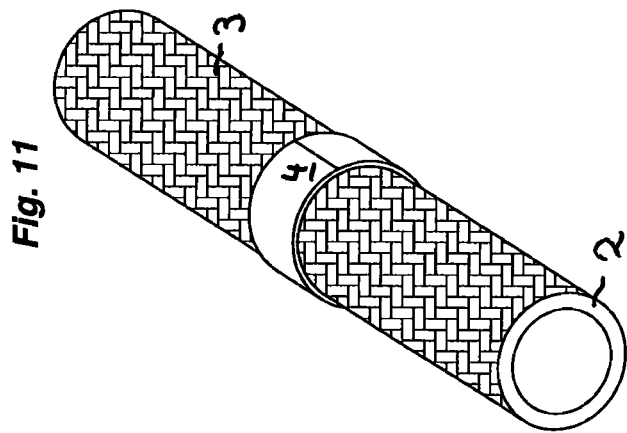
FIGS. 9 to 11 show method steps for cutting to length a piece of tube, a shrink tube being applied as a tube fixing element to the tube that is to be cut to length, which shrink tube can be reduced in its clear tube diameter by exposure to heat in such a way that t he shrink tube comes to lies immovably against the tube sheathing.
Figure 10:
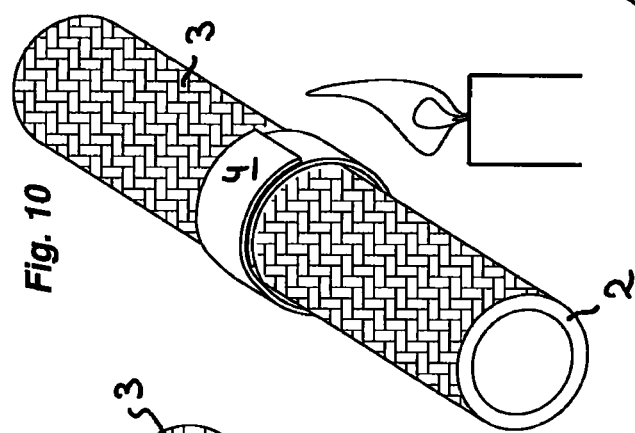
Figure 9:
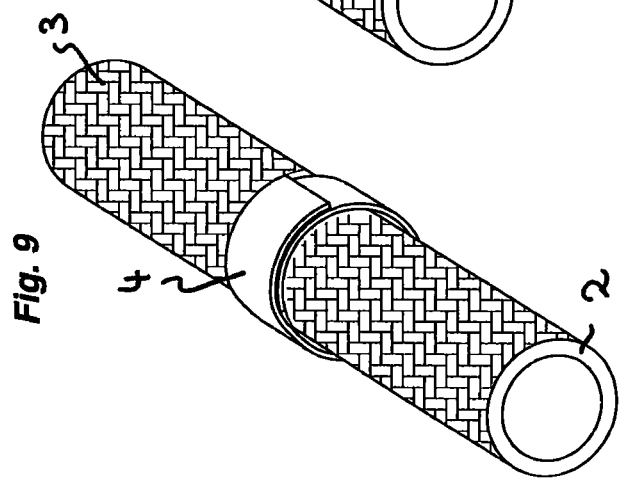

In FIGS. 9 to 11 there is illustrated a method variant in which a shrink tube serves as the tube fixing element 4. Although the shrink tube is represented in FIGS. 9 to 11 as a strip of material cut to length on both sides and the strip ends of which are adhesively attached to one another by exposure to heat, this shrink tube is usually an endless narrow band of material, the clear tube diameter of which can be reduced by exposure to heat in such a way that the shrink tube lies immovably against the tube outer circumference and in particular against the tube sheathing 3 of the tube.

In FIGS. 12 and 13 it is intended to illustrate that the width of the tube fixing element 4 in the longitudinal direction of the tube may be dimensioned such that the tube fixing element 4 projecting over the inner end of the tube end piece 5 forms an anti-kink device.

Figure 14:
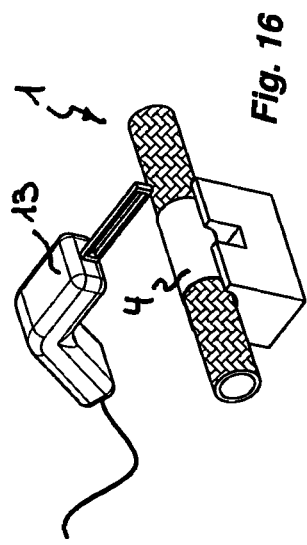
FIGS. 14 and 15 show the method steps intended for cutting to length a piece of tube, a guillotine-like cutting tool being used here, guided approximately perpendicularly to the longitudinal direction of the tube during the cutting operation.
Figure 15:
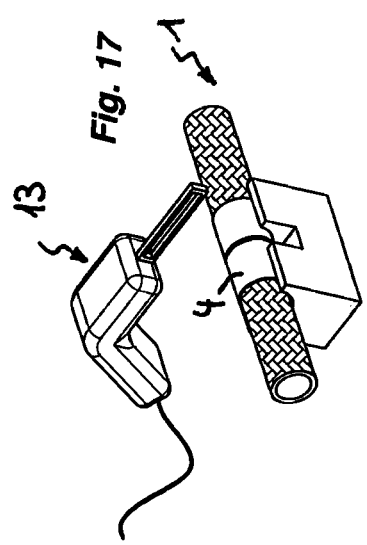

In FIGS. 14 to 17 it is shown that the tube completely enclosed by the tube fixing element 4 can be severed with the aid of the cutting tool in such a way that a relative displacement of the tube fixing element 4 with respect to the tube sheathing 3 or of the tube sheathing 3 with respect to the inner tube 2 is prevented. In FIGS. 14 and 15 it is provided for this purpose that the tube is cut to length with a cutting blade 12 that serves as a cutting tool and is guided approximately perpendicularly to the longitudinal axis of the tube.

Figure 16:
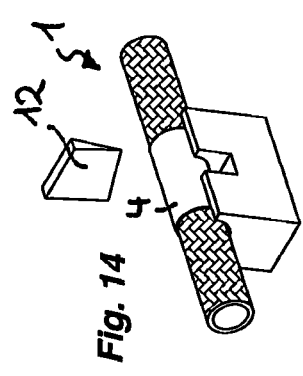
FIGS. 16 and 17 show the method steps intended for cutting to length a piece of tube, the tube being cut to length here with a cutting tool that develops a cutting heat.
Figure 17:
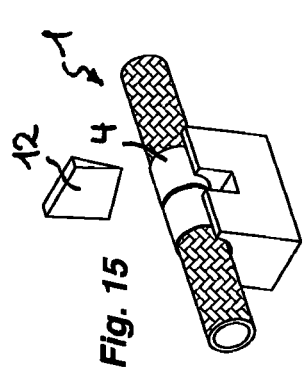

In the case of the exemplary embodiment illustrated in FIGS. 16 and 17, the tube is cut to length with a cutting tool 13 that develops a cutting heat, to be precise in such a way that the plastics material that becomes pasty while exposed to the cutting heat adhesively bonds or fuses at least one of the component parts: the tube fixing element 4, tube sheathing 3 or inner tube 2, at least in certain regions to at least one of the adjacent component parts 2, 3, 4. Instead of the cutting tool 13, formed here in the manner of a soldering iron, a laser apparatus with a laser beam, that likewise develops a cutting heat, may optionally be used.

In FIG. 18 it is shown that the tube fixing element 4 may also be formed by an injection-molding process as a tube surround that completely encloses the tube sheathing 3 in the circumferential direction in a partial portion.

Irrespective of whether adhesive tape, a shrink tube or a tube surround produced by an injection-molding process is used for the tube fixing element 4, it is expedient if the tube fixing element has a small thickness, and preferably a thickness of 0.5/100 ths to 8/100 ths of a mm.

The invention claimed is:

1. A method for cutting to length a piece of tube (1) from a tube, the tube having an inner tube (2) and an outer tube sheathing (3), enclosing the inner tube (2), the method comprising:
    detaching the piece of tube (1) from the tube with a cutting tool at a cutting site in a cutting plane oriented transversely to a longitudinal extent of said tube,
    surrounding the tube sheathing (3) of the tube with a severable tube fixing element (4), which is a single-sided adhesive tape that covers over an intended cutting site before the piece of tube (1) is detached from the tube with the cutting tool at the cutting site, with the tube fixing element (4) completely enclosing the outer tube sheathing (3) in a circumferential direction, wherein the tube fixing element (4), fixed on the tube sheathing (3), and the tube are severed by the cutting tool in such a way that a relative displacement of the tube fixing element (4) with respect to the tube sheathing (3) or of the tube sheathing (3) with respect to the inner tube (2) is prevented and wherein the tube fixing element (4), formed as the single-sided adhesive tape, has a middle piece (6), which completely encloses the tube and is adjoined on both sides by tube-fixing-element end pieces (7, 8), the tube-fixing-element end pieces (7, 8) lie with adhesive surfaces (9) thereof against one another and the tube-fixing-element end pieces (7, 8) that are lying with the adhesive surfaces (9) against one another are placed against the tube in such a way that the adhesive surface (9) of one of the tube-fixing-element end pieces (7, 8) is adhesively held on the tube or on the piece of tube by a partial region extending over the other tube-fixing-element end piece (8, 7).

2. The method as claimed in claim 1, further comprising cutting the tube to length with a cutting blade (12) that serves as a cutting tool and is guided approximately perpendicularly to the longitudinal direction of the tube.

3. The method as claimed in claim 1, wherein a clamping sleeve, a crimping sleeve or tube end piece (5) is pushed onto an end of the piece of tube (1) that is secured with the aid of the tube fixing element (4) and the tube fixing element (4) projects over an inner end of the tube end piece (5) and forms an anti-kink device.

4. The method as claimed in claim 1, further comprising cutting the tube to length with a cutting tool (13) that develops a cutting heat such that a plastic material of at least one of the tube sheathing or the tube fixing element that becomes pasty while exposed to the cutting heat fixes at least one of the component parts: the tube fixing element (4), tube sheathing (3) or inner tube (2), at least in certain regions to at least one of the adjacent component parts (2, 3, 4).

\* \* \* \* \*